(12) United States Patent
Wu

(10) Patent No.: US 7,545,448 B2
(45) Date of Patent: Jun. 9, 2009

(54) LIQUID CRYSTAL PANEL, DISPLAY AND DRIVING METHOD THEREOF

(75) Inventor: Ming-Chou Wu, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 539 days.

(21) Appl. No.: 11/271,785

(22) Filed: Nov. 14, 2005

(65) Prior Publication Data

US 2008/0158452 A1  Jul. 3, 2008

(30) Foreign Application Priority Data

Dec. 24, 2004  (TW) ............................... 93140570 A

(51) Int. Cl.
 *G02F 1/133* (2006.01)
(52) U.S. Cl. ....................................................... 349/34
(58) Field of Classification Search ....................... None
 See application file for complete search history.

(56) References Cited

U.S. PATENT DOCUMENTS

| 6,958,791 | B2 * | 10/2005 | Shimoshikiryo | 349/85 |
| 2008/0106660 | A1 * | 5/2008 | Kitayama et al. | 349/39 |
| 2008/0165298 | A1 * | 7/2008 | Song et al. | 349/37 |
| 2008/0165299 | A1 * | 7/2008 | Huang et al. | 349/38 |

\* cited by examiner

*Primary Examiner*—Sung H Pak
(74) *Attorney, Agent, or Firm*—Thomas, Kayden, Horstemeyer & Risley

(57) ABSTRACT

A liquid crystal panel, a liquid crystal display and a driving method are provided. The method comprises supplying different driving voltages in a plurality of areas of a unit pixel. The liquid crystal molecules in different areas receive different driving voltages to generate different arranging directions to promote the uniform brightness.

10 Claims, 12 Drawing Sheets

LIQUID CRYSTAL PANEL, DISPLAY AND DRIVING METHOD THEREOF

This application claims the benefit of Taiwan Application Serial No. 093140570, filed Dec. 24, 2004, the subject matter of which is incorporated herein by reference.

BACKGROUND OF THE INVENTION (1) Field of the Invention

The invention relates to a liquid crystal panel, a display and a driving method thereof, and more particularly to a method for uniform brightness in a liquid crystal panel or display with wide viewing angle characteristics.

(2) Description of the Related Art

Based on smaller, lighter, lower driving voltage and wider application, liquid crystal display (LCD) replaces the cathode ray tube (CRT) gradually. However, the nature of the liquid crystal material restricts the development of the LCD with wide viewing angle characteristics. Due to the shortcoming of the narrow viewing angle, observers are easy to feel noticeable color shift in the LCD.

Color shift is a phenomena that color varies with the viewing angle of the LCD. One cause of color shift is that liquid crystal molecules exhibit different light transmission in different viewing directions for observers. It causes brightness variation in different viewing direction, so that the white balance of the LCD is destroyed. For instance, a white image may become bluer or more yellow. Aqua, lawn-green or a color of skin are brighter with wider viewing angle. If these colors are further mixed with other colors, they becomes whiter than which color they should be. Generally, color shift occurs in most of the LCDs, particularly in VA mode LCDs.

FIG. 1 shows the way how to define the viewing angle. Point A is a base point on a display surface 10. There are innumerable planes, relative to the display surface 10, including a transverse plane defined as angle φ equal to 0 degree and a longitudinal plane defined as angle φ equal to 90 degree. The angle θ is between a normal line 11 of the display surface 10 and a line of sight from the observer. For example, angle θ equal to 0 degree represents that the observer is located over the display surface 10. In the transverse plane (angle φ equal to 0 degree), angle θ equal to 90 degree represents that the observer is located at the left/right of the display surface 10. In the longitudinal plane (angle φ equal to 90 degree), angle θ equal to 90 degree represents that the observer is located in front/rear of the display surface 10. For simplification, we define angle θ as a viewing angle in this article. A specific angle is called the largest viewing angle, at which the observer can not figure out the color shown on LCDs.

Referring to FIG. 2A and FIG. 2B, a pixel array and an unit pixel of the conventional LCD are shown. A liquid crystal panel 20 comprises an upper substrate 21, a lower substrate 22 and a pixel array including a plurality of unit pixels 23. For controlling brightness of the liquid crystal panel 20, each unit pixel 23 includes a common electrode 231 on the upper substrate 21, a thin film transistor (TFT) 232, a data line 233 and a scan line 234 on the lower substrate 22. The common electrode 231 is applied with a stable voltage. The TFT 232 has a source electrode 2321, a gate electrode 2322 and a drain electrode 2323. The source electrode 2321 is connected to the data line 233. The gate electrode 2322 is connected to the scan line 234. The drain electrode 2323 is connected to a pixel electrode 235. The ON/OFF control of the scan line 234 is performed by a two-level driving method.

Still referring to FIG. 2A-2B, after an external voltage inputs to the source electrode 2321 through data line 233 and drops, a drain voltage is created and passes to the pixel electrode 235. The absolute value of the voltage difference between the pixel electrode 235 and the common electrode 231 is called a driving voltage. The driving voltage affects the arrangement of the liquid crystal molecules 241 in the liquid crystal layer 24. Hence, the tilt direction of the liquid crystal molecules 241 varies with the external voltage, so as to change the transmission and the brightness of the liquid crystal panel 20. In order to maintain the driving voltage until the next external voltage inputs, a storage capacitor 236 is applied to the unit pixel 23. The storage capacitor(Cs) 236 has one end connected to the pixel electrode 235, and the other end connected to the scan line 234 of the former unit pixel (Cs on gate structure) or to the common electrode 231 (Cs on common structure).

FIG. 3A is a chart showing transmission-external voltage characteristic of a VA-mode liquid crystal display. The abscissa is the external voltage (V), and the ordinate is the transmission with a dimensionless unit (%). Curve 31 and curve 32 respectively represents the transmission-external voltage characteristic at viewing angle θ equal to 0 degree (front view) and 60 degree. The two curves 31 and 32 show that the liquid crystal molecules exhibit different transmission at different viewing angle θ when the same external voltage input to the unit pixel. And when the external voltage exceeds a threshold voltage, the liquid crystal molecules start to rotate to change the transmission. In FIG. 3A, the threshold voltage is about 2V.

FIG. 3B shows gamma curves of the VA-mode liquid crystal display. The abscissa is marked with 0-255 gray levels. The ordinate represents the transmission which is a normalized value with a dimensionless unit, and its maximum value is defined as 1. For each below 210 gray level, the transmission increases as the viewing angle increases. Under these gray levels, the larger viewing angle corresponds to more brightness.

To sum up, conventional method for controlling brightness can not overcome non-uniform brightness and color shift. The reason is that when supplying one external voltage to one unit pixel of the convention LCD, all liquid crystal molecules of the unit pixel will be driven to orient to the same direction. Therefore, the liquid crystal molecules guide the light to emit in the same direction. FIG. 4 is the orientation of the liquid crystal molecules in the unit pixel 40 having two different transmissions. The dashed line represents low transmission. Various techniques for overcoming non-uniform brightness or color shift are changing alignment films or adding a wide viewing film. These methods need to change a manufacturing process, so that they cause a brightness lost and a by-effect such as image sticking and cross talk etc.

SUMMARY OF THE INVENTION

Accordingly, the first object of the invention is to provide a method for creating uniform brightness in a liquid crystal display to overcome color shift and brightness lost.

The second object of the invention is to avoid image sticking and cross talk.

The third object of the invention is to regulate the driving voltage of the liquid crystal molecules by a chip with three or more-level driving method.

The forth object of the invention is to provide uniform brightness in the LCD with wide viewing angle without changing the manufacture process.

The invention provides a liquid crystal panel, a liquid crystal display and a driving method applied to the panel and the display to create uniform brightness. The panel has a pixel array including multiplicity unit pixels. Each of the unit pixels is divided into multiplicity areas and has multiplicity liquid crystal molecules. The driving method includes supplying different driving voltages to multiplicity areas of the unit pixel to make the liquid crystal molecules in different areas have difference orientations, and these orientations promote more uniform brightness under wider viewing angle. Specifically, supplying a first driving voltage to the unit pixel is to make the liquid crystal molecules tilt in one direction. Subsequently, regulating the first driving voltage to create a second driving voltage, and supplying the second driving voltage to one area of the unit pixel is to make the liquid crystal molecules in the area tilt in another direction. As a result, the liquid crystal molecules orient in different direction to form different transmissions to reduce the brightness variation with viewing angle.

As stated above, the liquid crystal panel includes the $M^{th}$ unit pixel divided into a first sub-pixel area and a second sub-pixel area. The first sub-pixel area includes a first TFT, a first storage capacitor and a first liquid crystal capacitor. The second sub-pixel area includes a second TFT, a second storage capacitor and a second liquid crystal capacitor. The two sub-pixel areas share one scan line, one data line and one common electrode. The voltage of the scan line is controlled by a chip with three or more-levels driving method.

The first TFT has a source electrode, a drain electrode and a gate electrode. The source electrode and the gate electrode of the first TFT are respectively connected to the data line and the scan line of the $M^{th}$ unit pixel. In the first sub-pixel area, one end of the first storage capacitor is connected to the drain electrode of the first TFT, the other end is connected to the common electrode. The voltage across the first storage capacitor acts as a driving voltage to the liquid crystal layer in the first sub-pixel area. The second TFT has a source electrode, a drain electrode and a gate electrode. The source electrode and the gate electrode of the second TFT are respectively connected to the data line and the scan line of the $M^{th}$ unit pixel. In the second sub-pixel area, one end of the second storage capacitor is connected to the drain electrode of the second TFT, and the other end is connected to the scan line of the $(M-1)^{th}$ unit pixel. The voltage across the second storage capacitor acts as a regulation voltage of the liquid crystal layer in the second sub-pixel area. The first driving voltage drives these liquid crystal molecules of the first sub-pixel. The regulation voltage regulates the first driving voltage to generate the second driving voltage. The second driving voltage can drive these liquid crystal molecules of the second sub-pixel area, and its value varies with the scan voltage of the $(M-1)^{th}$ unit pixel.

According to the method of the invention, the light through the unit pixel would not emit in one specific direction, so as to get more uniform brightness.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

Figure 1:
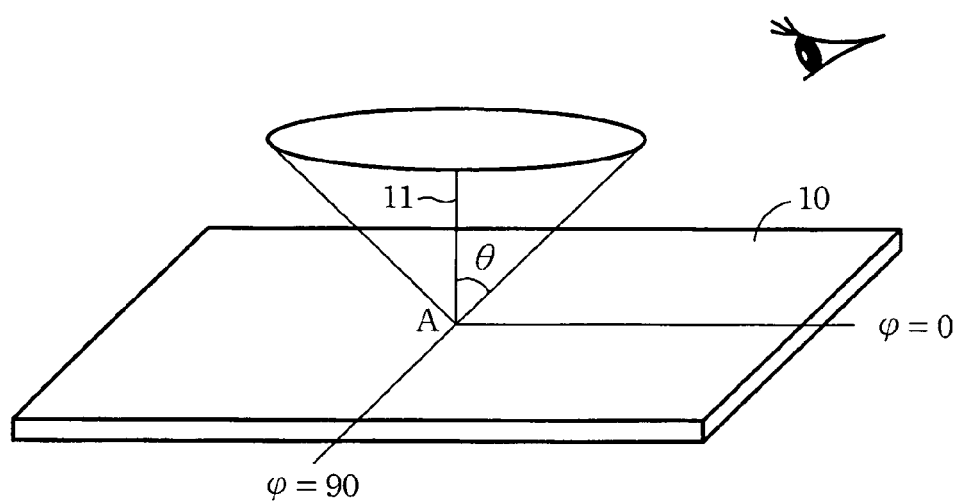
FIG. 1 is a chart showing how to define the viewing angle.
Figure 2A:
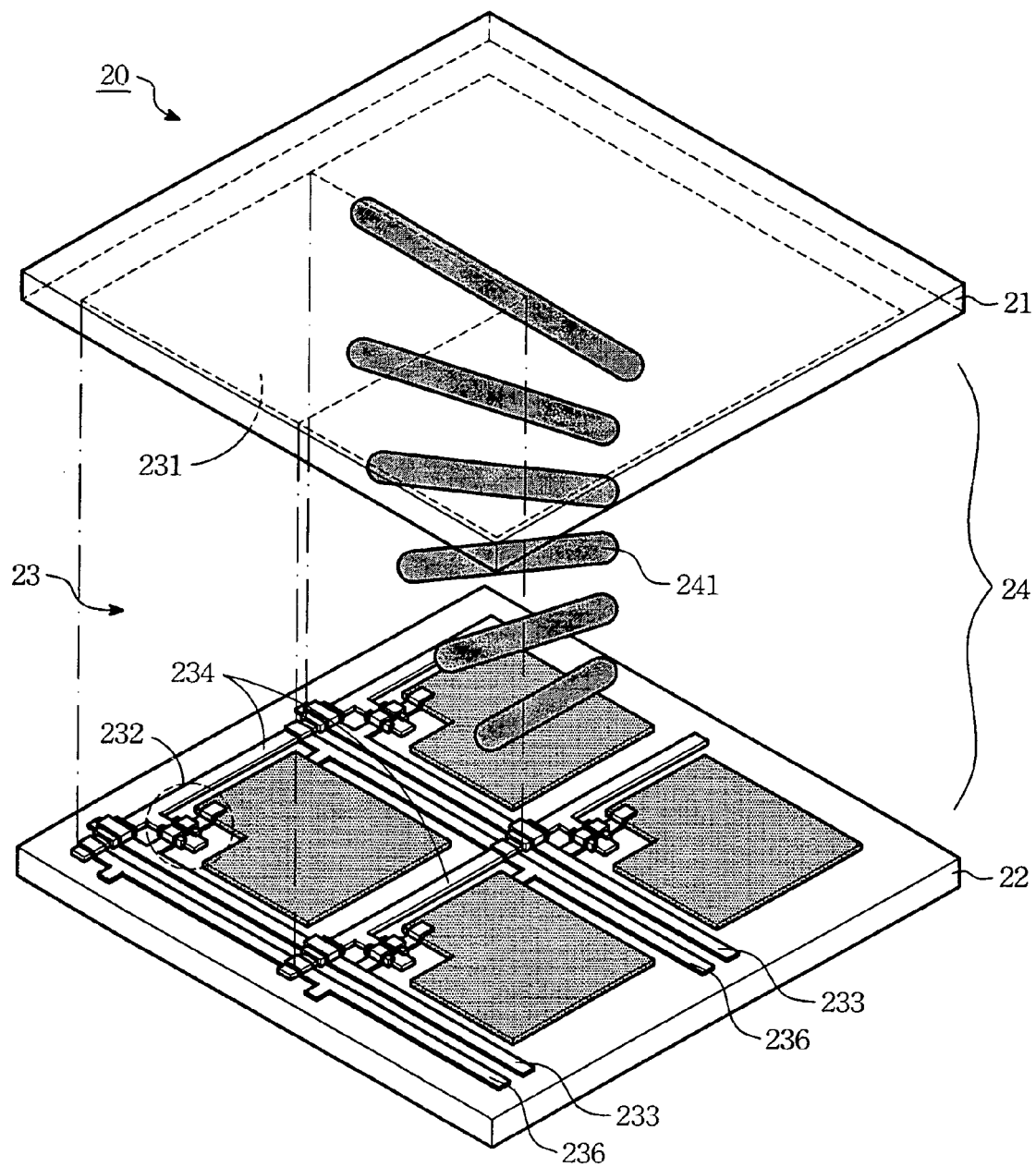
FIG. 2A is a chart showing a pixel array of the conventional LCD.
Figure 2B:
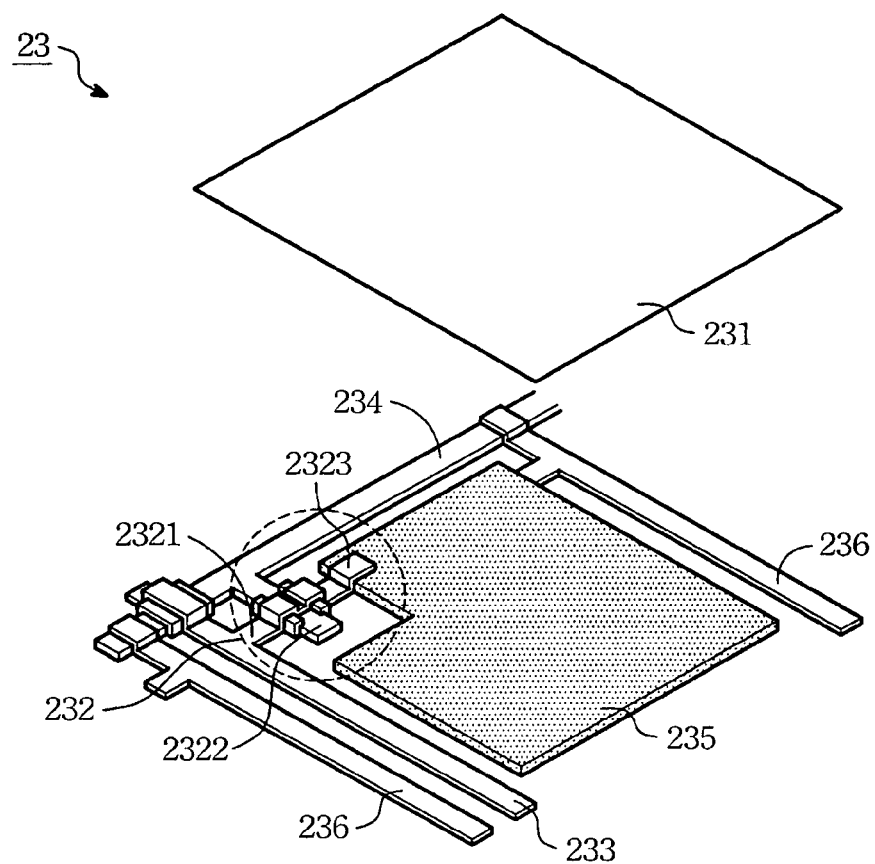
FIG. 2B is a chart showing an unit pixel of the conventional LCD.
Figure 3A:
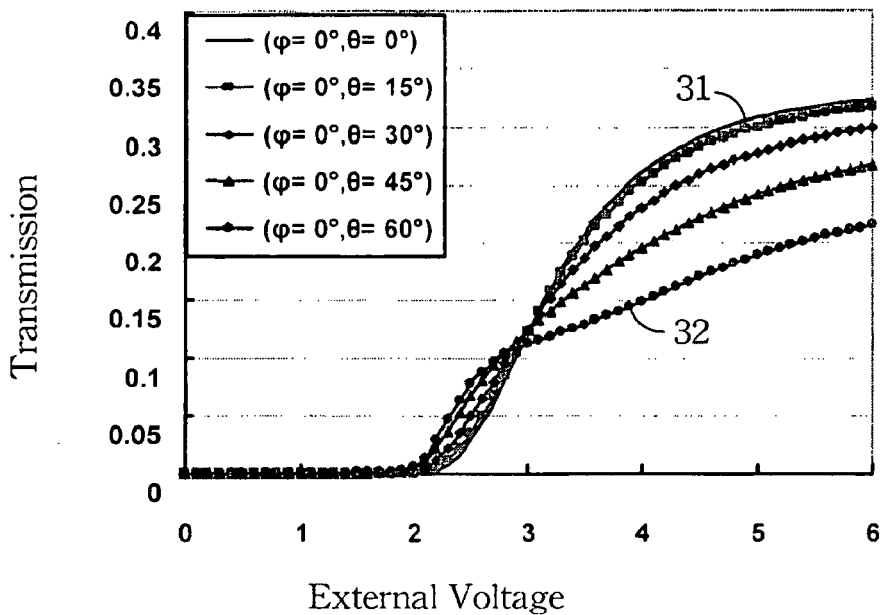
FIG. 3A is a chart showing transmission-external voltage characteristic of a VA-mode liquid crystal display.
Figure 3B:
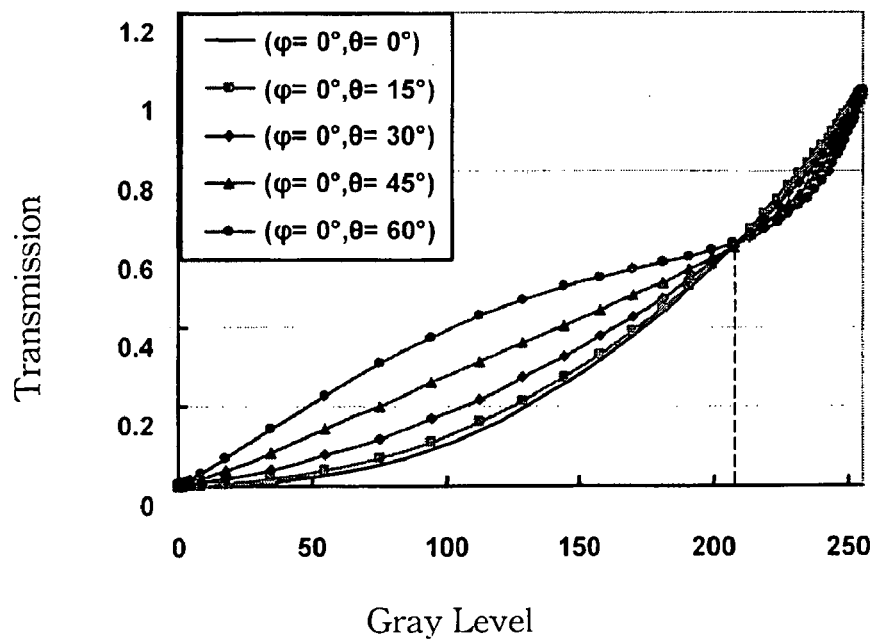
FIG. 3B is a chart showing gamma curves of the VA-mode liquid crystal display.
Figure 4:
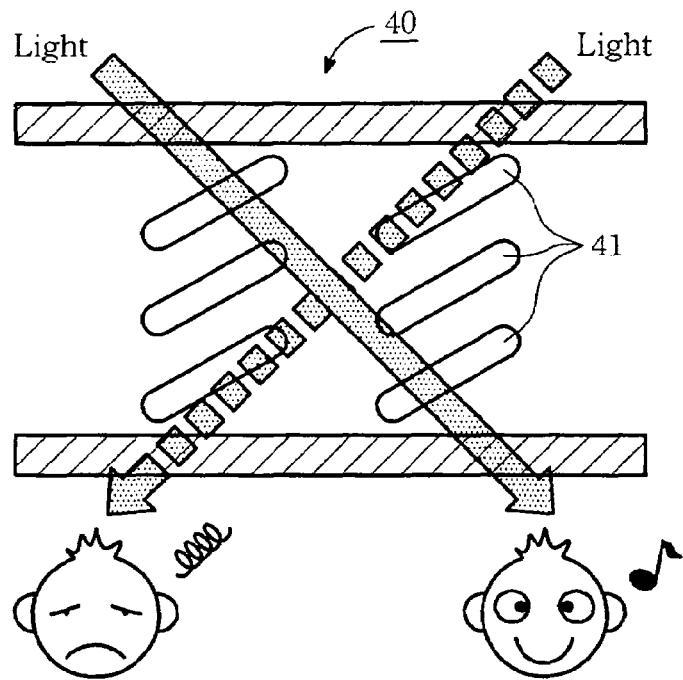
FIG. 4 is a chart showing the liquid crystal molecules having only one orientation direction in the unit pixel.
Figure 5:
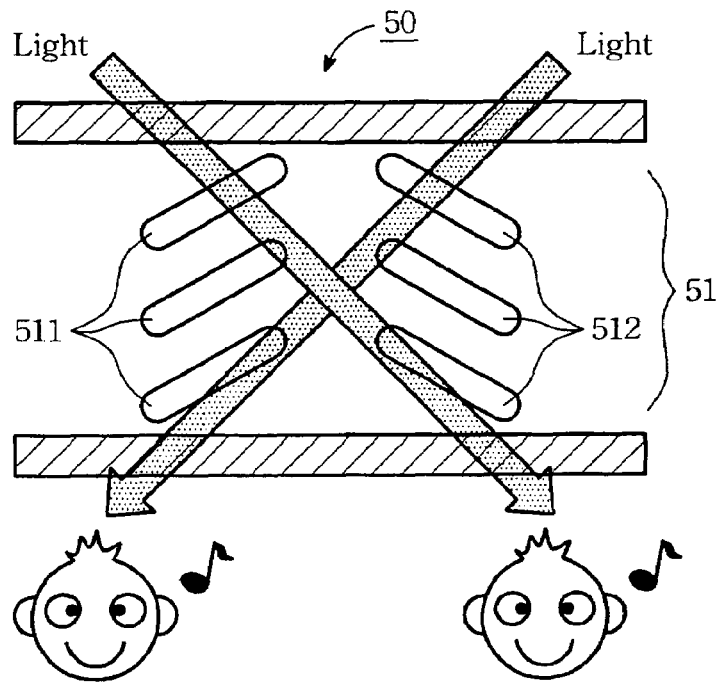
FIG. 5 is a chart showing an unit pixel including two orientation directions of liquid crystal molecules according to the present invention.

FIG. 5 shows an unit pixel 50 including two orientation directions of liquid crystal molecules. In the unit pixel 50, the liquid crystal molecules 511 and 512 orient in two directions to form different transmissions to reduce brightness variation as the viewing angle changes.

A liquid crystal panel of the invention includes a pixel array having at least one unit pixel 50. The unit pixel 50 has a liquid crystal layer 51 which includes a plurality of liquid crystal molecules 511 and 512. And the major axes of the liquid crystal molecules 511 and 512 respectively arrange in different orientation directions. For generating more uniform brightness with different viewing angles, one unit pixel is divided into a plurality of areas, and these areas each are provided different driving voltages.

In the unit pixel, each one of these areas has one TFT and one capacitor. But these areas share one data line and one scan line. The data line conducts the same external voltage to the plurality of areas of the unit pixel intermittently through theirs own TFT. During the external voltage inputs, the storage capacitors are charged with different voltages. Without applying the external voltage, the storage capacitors discharge to supply different driving voltages to these liquid crystal molecules in different areas. To avoid reduction of the aperture ratio of the unit pixel, preferably, one unit pixel can be divided into two areas. A first driving voltage is supplied to make all liquid crystal molecules tilt in one direction. And then, the storage capacitor regulates the first driving voltage to create a second driving voltage in a part of the unit pixel. The second driving voltage is provided for the liquid crystal molecules in the part of the unit pixel to tilt in another direction.

Initially, major axes of the liquid crystal molecules may be parallel to or perpendicular to a pair of substrates of the panel. The absolute value of the voltage difference between the drain electrode and the common electrode is defined as the first driving voltage. The gate voltage of the former unit pixel is applied to one area of the unit pixel by a three-level addressing method. The voltage difference between the gate electrode of the former unit pixel and the common electrode is defined as the second driving voltage. Briefly, one external voltage can create two driving voltages in one unit pixel.

Figure 6:
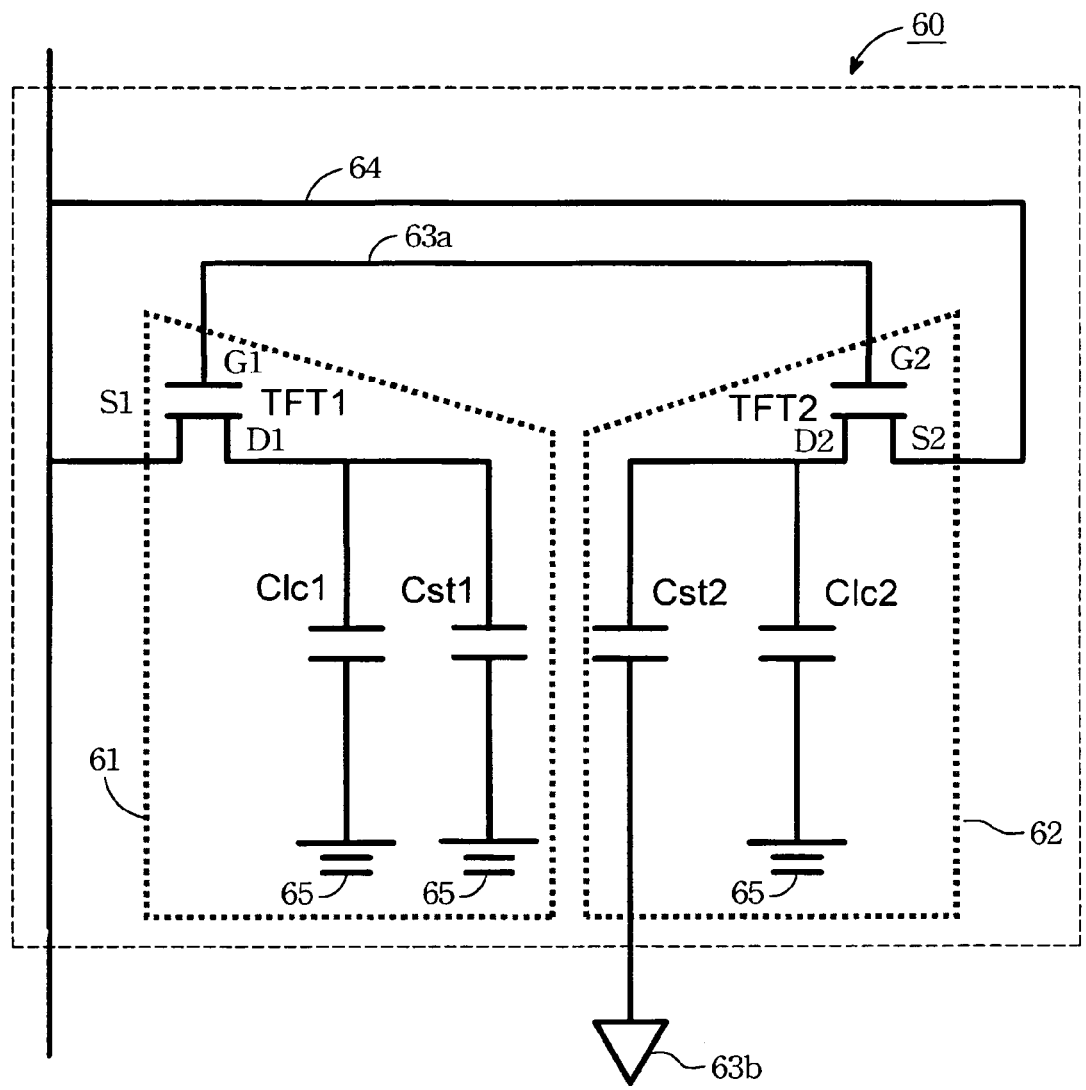
FIG. 6 is a chart showing a first embodiment of the circuit according to the present invention to provide uniform brightness over the liquid crystal display.

FIG. 6 is a chart showing an equivalent circuit of a first embodiment according to the present invention. The equivalent circuit 60 is disposed in a panel which has a liquid crystal layer and a plurality of unit pixels. The $M^{th}$ of these unit pixels is divided into a first sub-pixel area 61 and a second sub-pixel area 62. The first sub-pixel area 61 includes a first TFT (TFT1), a first storage capacitor (Cst1) and a first liquid crystal capacitor (Clc1). The second sub-pixel area 62 includes a second TFT (TFT2), a second storage capacitor (Cst2) and a second liquid crystal capacitor (Clc2). The two sub-pixel areas 61, 62 share the scan line 63a, the data line 64 and the common electrode 65. The first crystal capacitor Clc1 and the second liquid crystal capacitor Clc2 are the liquid crystal layers which act as a capacitors in the first sub-pixel area 61 and in the second sub-pixel area 62.

Still referring to FIG. 6, TFT1 has a source electrode SI, a drain electrode D1 and a gate electrode G1. TFT2 has a source electrode S2, a drain electrode D2 and a gate electrode G2. Scan line 63a is electrically connected to the gate electrode G1 and the gate electrode G2. In the first sub-pixel area 61, one end of the capacitor Cst1 is connected to the drain electrode D1, the other end is connected to the common electrode 65. The voltage across the capacitor Cst1 acts as a driving voltage of the liquid crystal layer in the first sub-pixel area 61. In the second sub-pixel area 62, one end of the capacitor Cst2 is connected to the drain electrode D2, and the other end is connected to the scan line 63b of the $(M-1)^{th}$ unit pixel. The voltage across the capacitor Cst2 acts as a regulation voltage of the liquid crystal layer in the first sub-pixel area 62. The first driving voltage drives these liquid crystal molecules of the first sub-pixel area 61. The regulation voltage adjusts the first driving voltage to generate the second driving voltage. The second driving voltage can drive these liquid crystal molecules of the second sub-pixel area 62, and its value varies as the scan voltage of the $(M-1)^{th}$ unit pixel changes.

Figure 7:
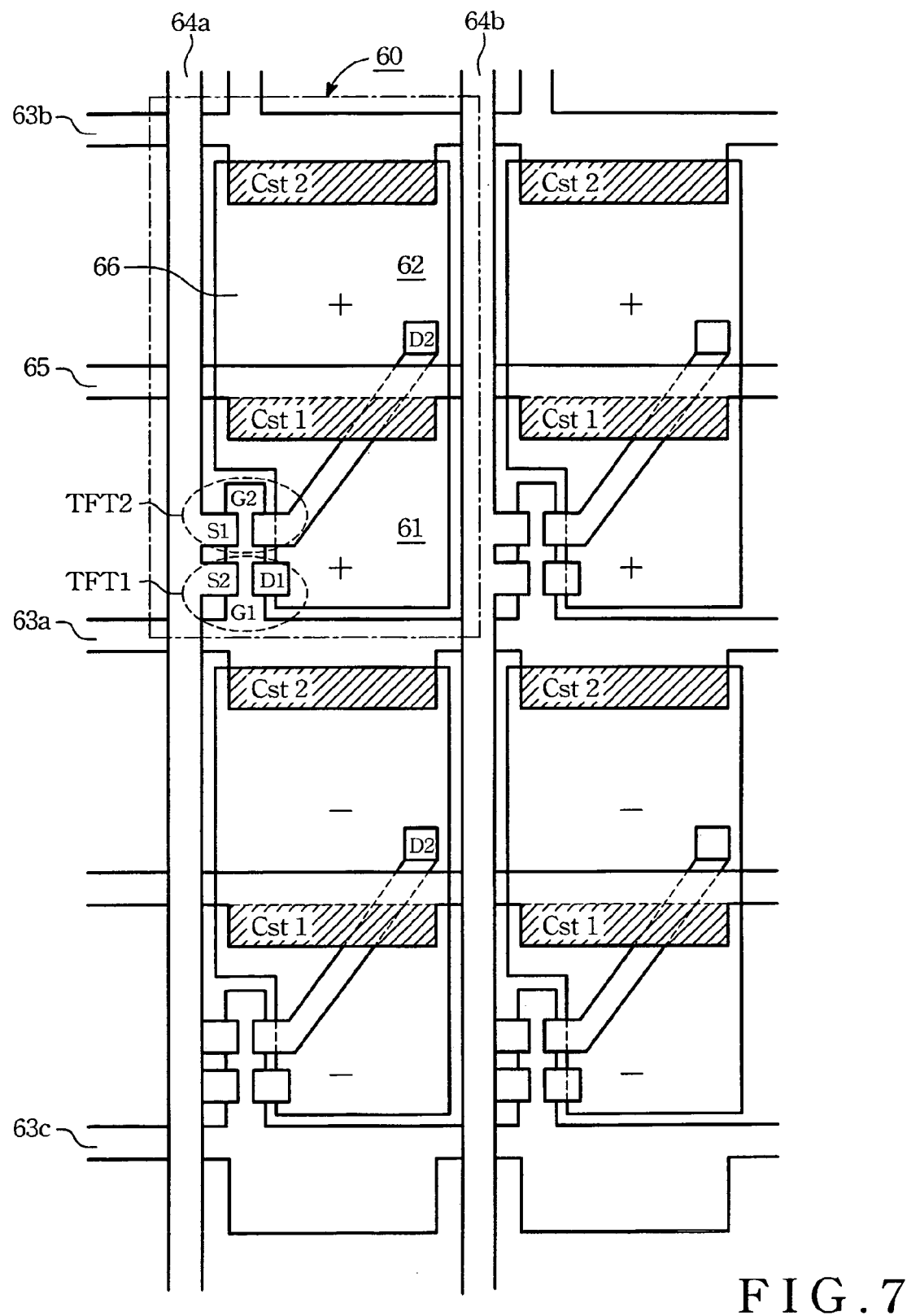
FIG. 7 is a chart showing a pixel structure according to the circuit of FIG. 6.

FIG. 7 is a chart showing pixel structures of FIG. 6. Four unit pixels include three horizontal scan lines 63a, 63b and 63c, and two vertical data line 64a and 64b. The $M^{th}$ unit pixel 60 includes TFT1 and TFT2, and two sub-pixel areas 61 and 62 divided by the common electrode 65. TFT1 is used as a switch device of the first sub-pixel area 61, and TFT2 is used as a switch device of the second sub-pixel area 62. Both source electrode S1 and S2 are connected to data line 64a. Gate electrode G1 and G2 are connected to the scan line 63a. One end of the capacitor Cst2 is connected to the scan line 63b of the $(M-1)^{th}$ unit pixel, the other end is connected to the drain electrode D2 of the TFT2 through pixel electrode 66. In addition, the signal of data line 64a with line inversion mode can control polarity inversion of the liquid crystal molecules. As shown in FIG. 7, both the first sub-pixel area 61 and the second sub-pixel area 62 are signed "+" to represent similar brightness for wide viewing angle.

Figure 8A:
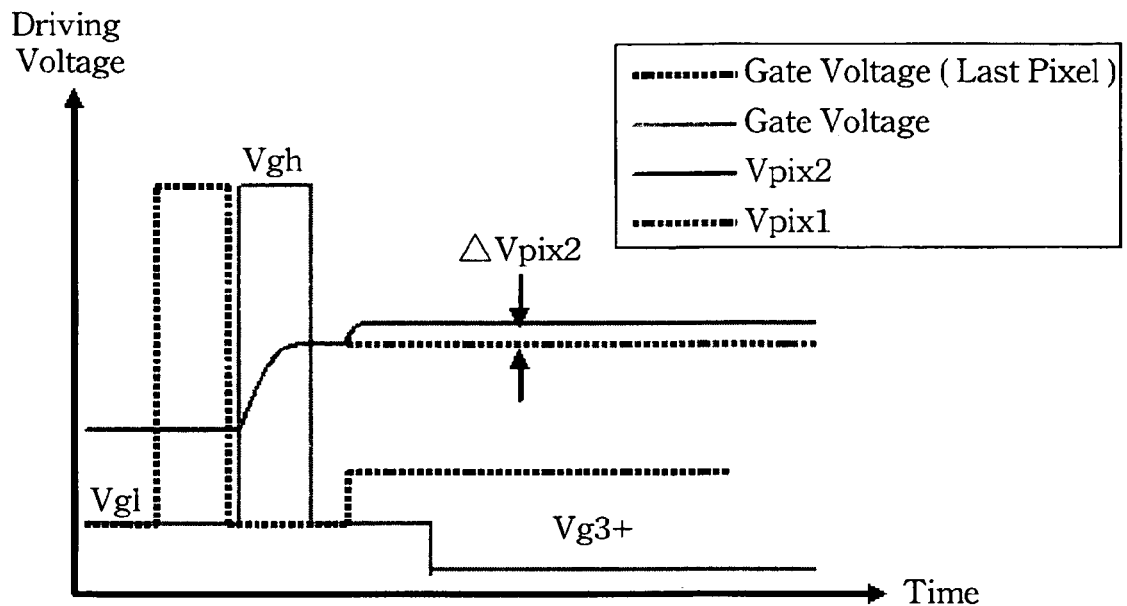
FIG. 8A to 8B are driving waveforms of the first sub-pixel area and the second sub-pixel area in FIG. 6.
Figure 8B:
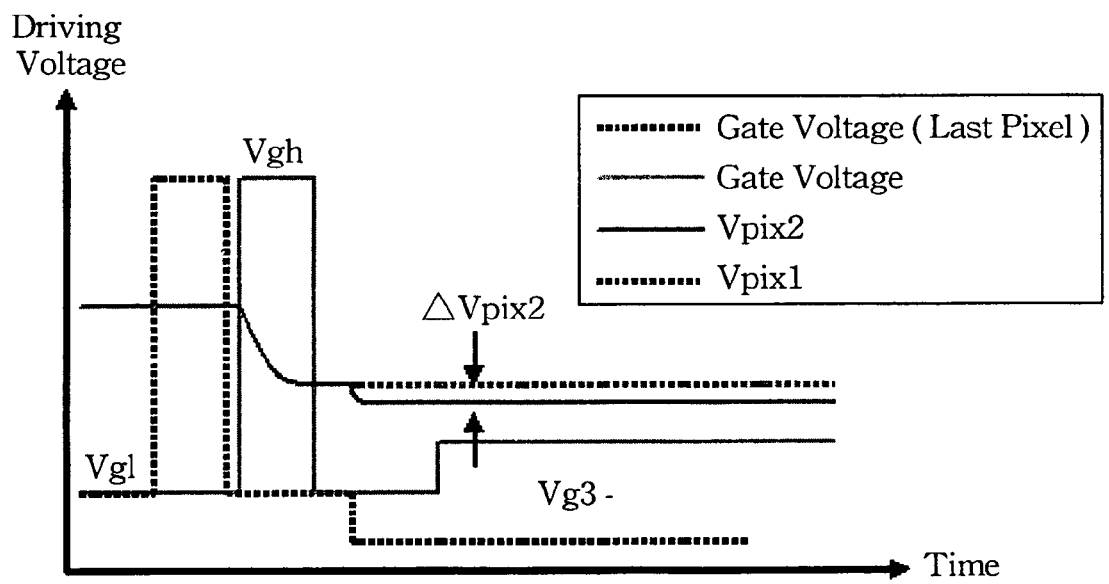

FIG. 8A-8B are driving waveforms of the first sub-pixel area 61 and the second sub-pixel area 62 in FIG. 6. The driving voltage includes the first driving voltage Vpix1, and the second driving voltage Vpix2. The gate voltage has three level such as Vg1, Vgh and Vg3+/Vg3−. Vgh and Vg1 are used to control the ON/OFF of the TFT1 and the TFT2. Vg3+/Vg3− change periodically to generate the regulation voltage in the second sub-pixel area 62. When the positive period appears in the $(M-1)^{th}$ unit pixel, the negative period appears in the $M^{th}$ unit pixel at the same time, and vice versa when the positive period appears in the $M^{th}$ unit pixel.

In FIG. 8A, when the gate voltage is varied from Vg1 to Vg3+, the first driving voltage Vpix1 is still constant. The reason is that the capacitor Cst1 is not connected to the scan line 63b, but is connected to the common electrode 65, so the gate voltage does not affect the first driving voltage Vpix1. On the other hand, the second driving voltage Vpix2 is changed because the capacitor Cst2 is connected to the scan line 63b.

Thus, the gate voltage of the $(M-1)^{th}$ unit pixel can affect the second driving voltage Vpix2. The variation of the second driving voltage Vpix2 affected by the regulation voltage is calculated by the equation $\Delta Vpix2=[Cst2/(Cst2+Clc2)]\times(Vg3-Vg1)$. If the size of the capacitor Clc2 is reducing, the regulation voltage $\Delta Vpix2$ is increasing, and vice versa if the size of the capacitor Clc2 is increasing. The dielectric constant of the liquid crystal molecule in the major axial direction is different from in the minor axial direction, so that smaller driving voltage results in smaller Clc2, and larger driving voltage results in larger Clc2. In VA-mode display, the smaller driving voltage represents lower gray-level and lower brightness. The larger $\Delta Vpix2$ can increase the brightness difference in lower gray-level in the, second sub-pixel area 62, and the smaller $\Delta Vpix2$ can reduce the brightness difference in higher gray-level in the second sub-pixel area 62. Thus, the panel according to the present invention has more uniform brightness for different viewing angles, and the external voltage has different threshold values.

The liquid crystal molecules can not load a constant voltage over a long period of time, otherwise the liquid crystal molecules may be destroyed and not to rotate while the electric field changes. A positive driving voltage or a negative driving voltage with the same absolute value can create the same gray-level. As shown in FIG. 8A, the driving voltage is positive when the pixel electrode voltage is higher than the common electrode voltage. As shown in FIG. 8B, the driving voltage is negative when the pixel electrode voltage is lower than the common electrode voltage. When the absolute value of the voltage difference between the pixel electrode and the common electrode is constant, the gray-level is constant. The waveforms of FIG. 8A and FIG. 8B alternate and repeatedly change, so that the liquid molecules repeatedly change their rotation directions or polarity by accepting the positive and negative driving voltage alternatively. Therefore, that can avoid destroying the nature of the liquid crystal molecules.

Figure 9:
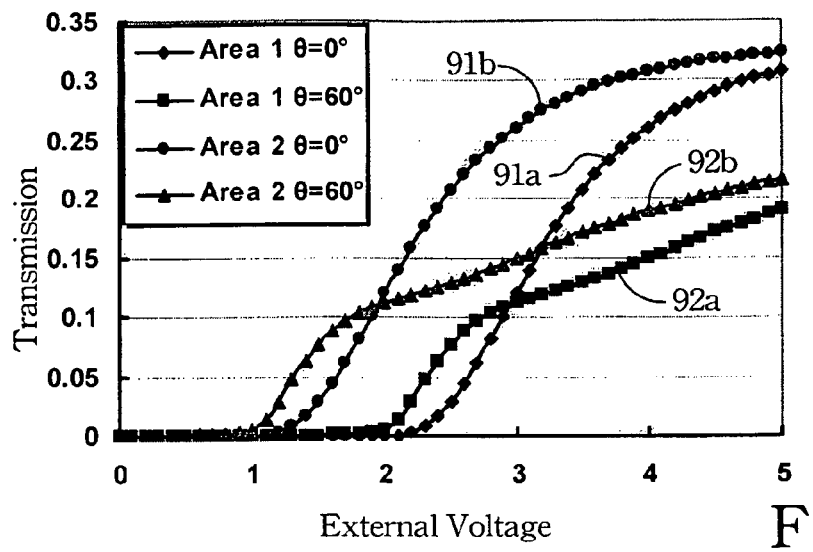
FIG. 9 is a chart showing relation between transmission-external voltage and transmission of the liquid crystal display according to the present invention.

FIG. 9 is transmission-external voltage characteristic of the liquid crystal display according to the present invention. The abscissa represents the external voltage (V), and the ordinate represents the transmission with a dimensionless unit. Curve 91a and curve 92a respectively represents transmission-external voltage characteristic of the first sub-pixel area 61 at view angle θ equal to 0 degree (front view) and 60 degree. Curve 91b and curve 92b respectively represents transmission-external voltage characteristic of the second sub-pixel area 62 at view angle θ equal to 0 degree (front view) and 60 degree. Curve 91b and 92b are the results of shifting curve 91a and 92a to the left, and the shift is about 1V. Comparing with the two curves 91a, 91b or the two curves 92a, 92b, it shows that the same external voltage can applied to generate different driving voltages. The liquid crystal molecules in different sub-pixel areas have different transmission. As shown, the threshold voltage in prior art is 2V. After shifting left, threshold voltage becomes about 1V, so the threshold voltage is possible from about 1V to 2V in the present invention.

Figure 10A:
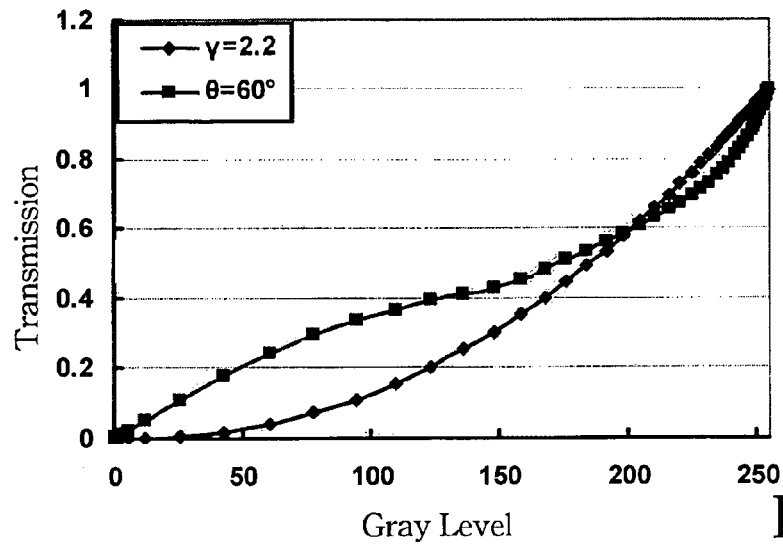
FIG. 10A to 10D show gamma curves when respectively selecting 2:8, 4:6, 6:4 and 8:2 as the area ratio of the first sub-pixel area to the second sub-pixel area.
Figure 10B:
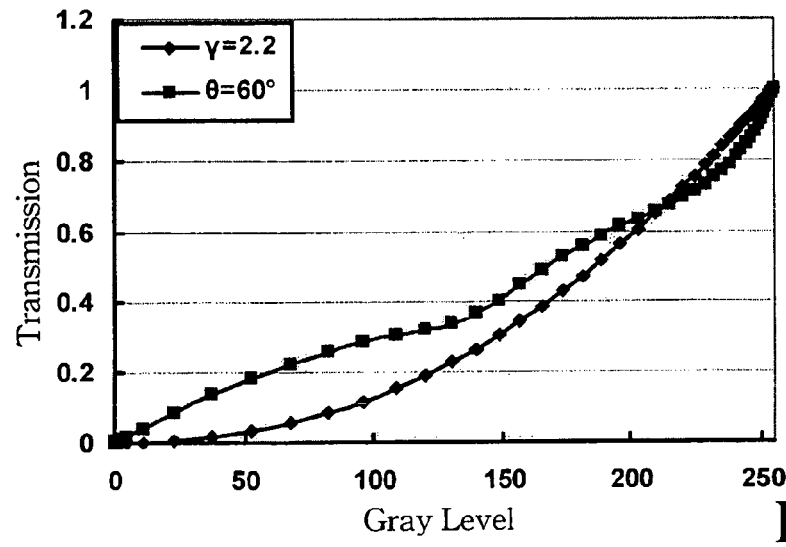
Figure 10C:
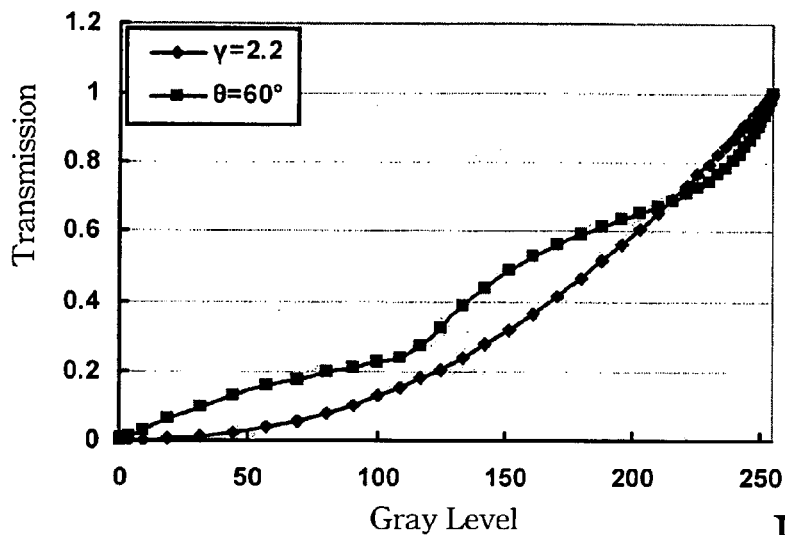
Figure 10D:
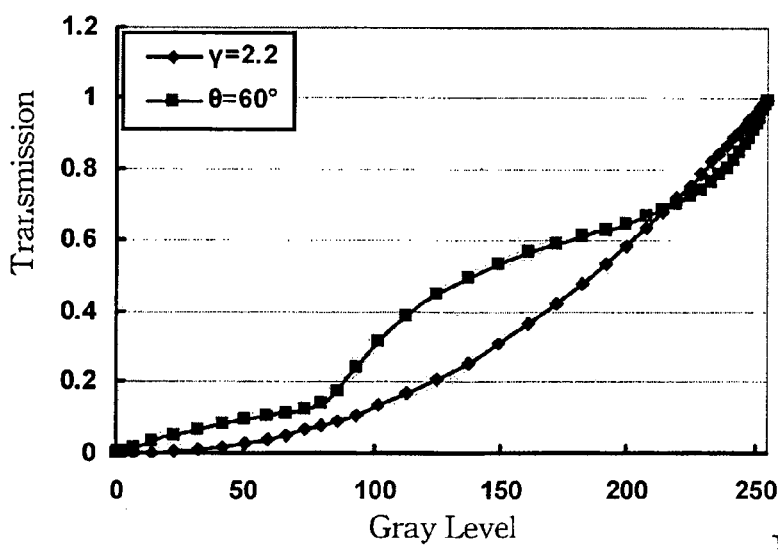

FIG. 10A-10D show gamma curves when respectively selecting 2:8, 4:6, 6:4 and 8:2 as the area ratios of the first sub-pixel area to the second sub-pixel area. In FIG. 10C, the curve at viewing angle θ equal to 60 degree is the closest to the curve at viewing angle θ equal to 0 degree, when the area ratio is 6:4. Under the area ratio of 6:4, if the viewing angle θ changes, the brightness and the color have the least variation, so the display has the best quality of image.

Figure 11:
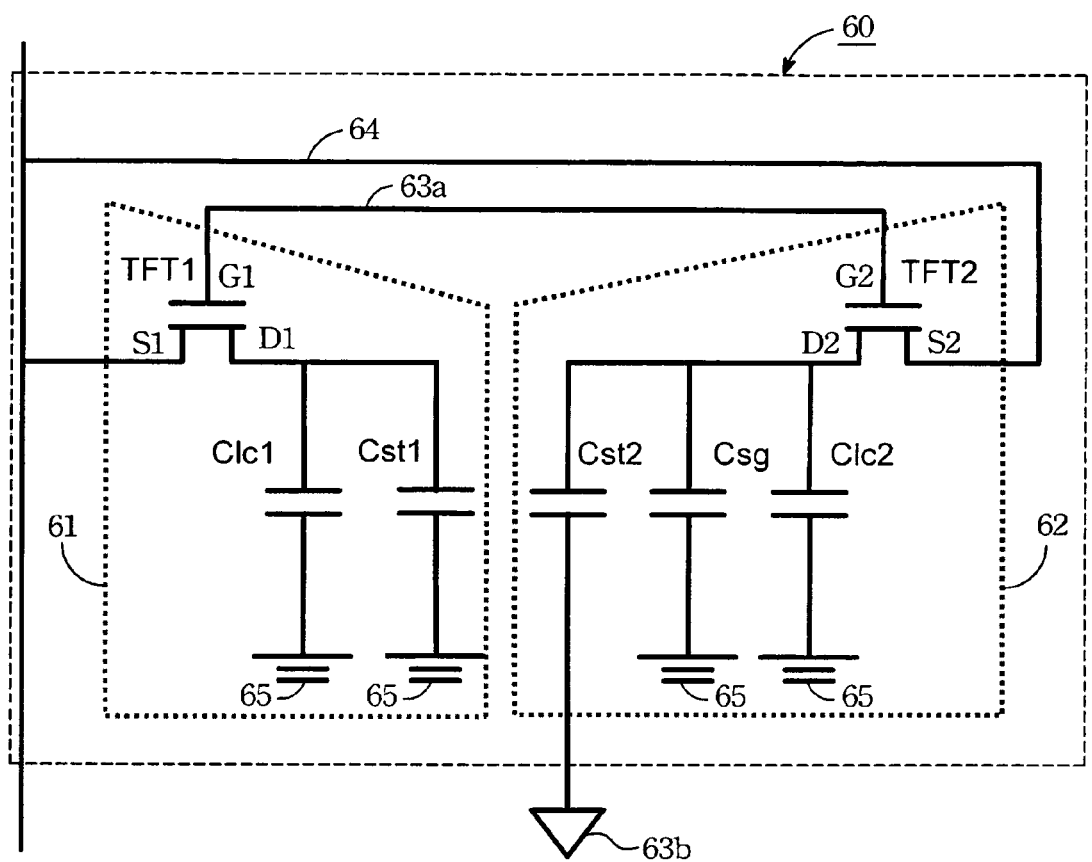
FIG. 11 is a chart showing a second embodiment of the circuit according to the present invention to provide uniform brightness over the liquid crystal display.

FIG. 11 is a chart showing an equivalent circuit of a second embodiment according to the present invention. Comparing with FIG. 6, an auxiliary capacitor Csg is added to the second sub-pixel area 62 of the $M^{th}$ unit pixel. Two end of the auxiliary capacitor Csg are respectively connected to the drain electrode D2 and the common electrode 65 to generate an auxiliary voltage. The auxiliary capacitor Csg can reduce the voltage across the second storage capacitor Cst2 to avoid large gate delay. The ΔVpix2 is calculated by the equation [Cst2/(Cst2+Clc2+Csg)]×(Vg3−Vg1), and it can get the same result as the first embodiment according to FIG. 6.

Figure 12:
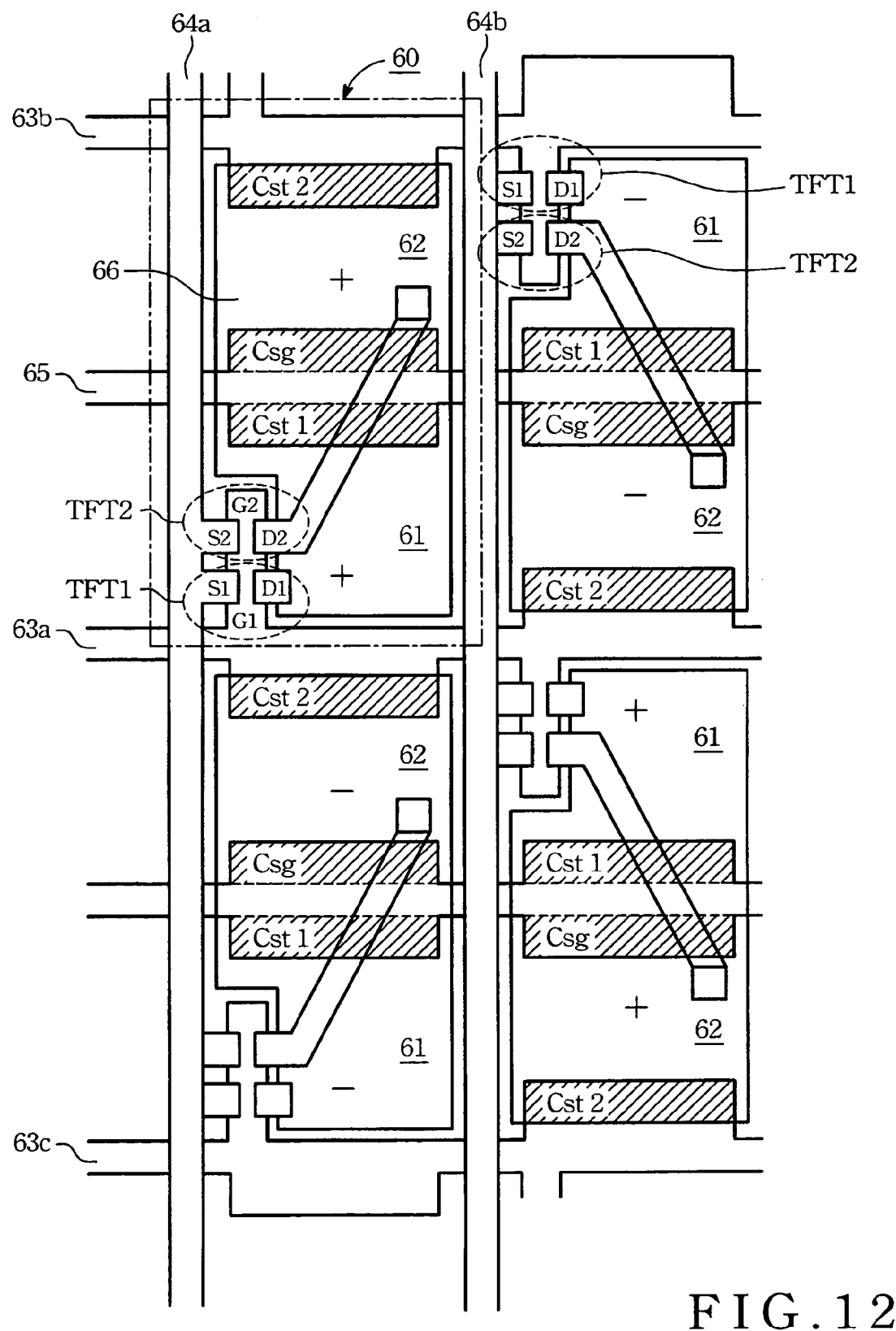
FIG. 12 is a chart showing a pixel structure according to the circuit of FIG. 11.

FIG. 12 is a chart showing pixel structures of FIG. 11. One end of the additional auxiliary capacitor Csg is connected to the common electrode 65, and the other end is connected to the drain electrode D2 of the TFT2 through the pixel electrode 66. The first storage capacitor Cst1 is also connected to the common electrode 65. One end of the second storage Cst2 is connected to the scan line 63b of the (M−1)$^{th}$ unit pixel, the other end is connected to the drain electrode D2 of the TFT2 through pixel electrode 66. Notice that a dot inversion mode is provided for the pixel array to avoid the voltage variation of the common electrode 65. The elements, such as TFTs or capacitors in the two columns of pixels, are arranged in the opposite direction for the requirement of the dot inversion. Under the dot inversion mode, the mark "+" represents similar brightness in both the first sub-pixel area 61 and the second sub-pixel area 62 for wide viewing angle.

The method for generating uniform brightness is applied in LCD with wide viewing angle characteristics. The unit pixel in display may have equivalent circuits as shown in FIG. 6 and FIG. 11, and the pixel structures as shown in FIG. 7 and FIG. 12. The variation of the first driving voltage, the second driving voltage and the gate voltage variation as shown in FIG. 8A-8B. The display of the invention may be MVA-mode or IPS-mode LCD, and their largest viewing angle can approach the requirement of about 89 degree.

What is claimed is:

1. A liquid crystal panel comprising:
   a substrate;
   a plurality of data lines disposed on the substrate;
   a plurality of scan lines disposed on the substrate and perpendicular to the plurality of data lines;
   a plurality of common electrodes disposed on the substrate and perpendicular to the plurality of data lines; and
   a plurality of unit pixels including at least a first unit pixel and a second unit pixel, wherein each of the unit pixels includes:
      a first sub-pixel area including:
         a first transistor having a source electrode and a gate electrode respectively connected to one of the data lines and one of the scan lines; and
         a first storage capacitor connected to a drain electrode of the first transistor and to one of the common electrodes; and
      a second sub-pixel area including:
         a second transistor having a source electrode and a gate electrode respectively connected to the data line and the scan line of the first transistor; and
         a second storage capacitor connected to a drain electrode of the second transistor,
   wherein one end of the second storage capacitor of the second unit pixel is electrically connected to the drain electrode of the second transistor of the second unit pixel, and the other end of the second storage capacitor of the second unit pixel is connected to the scan line which is connected to the gate electrode of the first transistor of the first unit pixel.

2. The liquid crystal panel of claim 1, wherein the second sub-pixel area further includes an auxiliary capacitor connected to the drain electrode of the second transistor and to the common electrode.

3. The liquid crystal panel of claim 1, wherein the area ratio of the first sub-pixel area to the second sub-pixel area is about 6 to 4.

4. The liquid crystal panel of claim 1, wherein the area of the first sub-pixel area is about 20% to 80% of that of the first pixel.

5. A method for driving a liquid crystal display, comprising:
   providing a liquid crystal panel, wherein the liquid crystal panel comprises:
      a substrate;
      a plurality of data lines disposed on the substrate;
      a plurality of scan lines disposed on the substrate and perpendicular to the plurality of data lines;
      a plurality of common electrodes disposed on the substrate and perpendicular to the plurality of data lines; and
      a plurality of unit pixels including at least a first unit pixel and a second unit pixel, wherein each of the unit pixels includes:
         a first sub-pixel area including:
            a first transistor having a source electrode and a gate electrode respectively connected to one of the data lines and one of the scan lines; and
            a first storage capacitor connected to a drain electrode of the first transistor and to one of the common electrodes; and
         a second sub-pixel area including:
            a second transistor having a source electrode and a gate electrode respectively connected to the data line and the scan line of the first transistor; and
            a second storage capacitor connected to a drain electrode of the second transistor,
   wherein one end of the second storage capacitor of the second unit pixel is electrically connected to the drain electrode of the second transistor of the second unit pixel, and the other end of the second storage capacitor of the second unit pixel is connected to the scan line which is connected to the gate electrode of the first transistor of the first unit pixel;
   providing a drain voltage to the first unit pixel, so as to generate a first driving voltage from the difference between the drain voltage and the common electrode voltage to drive the first sub-pixel area;
   providing an regulation voltage to the second sub-pixel area; and
   generating a second driving voltage according to the regulation voltage to drive the second sub-pixel area.

6. The method of claim 5, wherein the step of providing the regulation voltage to the second sub-pixel area comprises providing a gate voltage to a second sub-pixel pixel, and generating the regulation voltage from the difference between the gate voltage and the drain voltage.

7. The method of claim 5, further comprising providing an auxiliary voltage to change the value of the regulation voltage.

8. The method of claim 7, wherein providing an auxiliary voltage to change the value of the regulation voltage comprises providing an auxiliary voltage to reduce the regulation voltage.

9. The method of claim 7, wherein the step of providing the auxiliary voltage to change the value of the regulation voltage further comprises generating the auxiliary voltage from the difference between the drain voltage and the common electrode voltage.

10. A liquid crystal display comprising the liquid crystal panel of claim 1.

* * * * *